(12) United States Patent  
Stegmair et al.

(10) Patent No.: US 8,225,607 B2  
(45) Date of Patent: Jul. 24, 2012

(54) VANE-CELL MACHINE AND METHOD FOR WASTE HEAT UTILIZATION, USING VANE-CELL MACHINES

(76) Inventors: Michael Stegmair, Aichach-Untermauerbach (DE); Daniel Stegmair, Aichach-Untermauerbach (DE)

( * ) Notice: Subject to any disclaimer, the term of this patent is extended or adjusted under 35 U.S.C. 154(b) by 935 days.

(21) Appl. No.: 12/095,389

(22) PCT Filed: Nov. 29, 2005

(86) PCT No.: PCT/IB2005/053958  
§ 371 (c)(1),  
(2), (4) Date: Oct. 1, 2008

(87) PCT Pub. No.: WO2007/063357  
PCT Pub. Date: Jun. 7, 2007

(65) Prior Publication Data  
US 2009/0028735 A1        Jan. 29, 2009

(51) Int. Cl.  
B60K 6/20        (2007.10)  
F01K 25/08      (2006.01)  
F16D 31/02      (2006.01)  
F02B 53/00      (2006.01)  
F01C 1/00        (2006.01)  
F04C 18/00      (2006.01)  
F04C 2/00        (2006.01)

(52) U.S. Cl. .............. 60/597; 60/651; 60/456; 123/243; 418/256; 418/257; 418/264; 418/265

(58) Field of Classification Search .............. 60/597, 60/456, 651, 620, 39.05, 39.182, 39.511, 60/39.55; 418/159, 256–257, 260, 264–265; 123/231, 243; F01C 11/00, 1/344  
See application file for complete search history.

(56) References Cited

U.S. PATENT DOCUMENTS

| | | | | |
|---|---|---|---|---|
| 1,790,280 A | * | 1/1931 | Nichol | 123/231 |
| 2,195,812 A | * | 4/1940 | Czarnecki | 418/225 |
| 2,414,187 A | * | 1/1947 | Borsting | 418/256 |
| 2,465,887 A | * | 3/1949 | Larsh | 418/265 |
| 3,054,264 A | * | 9/1962 | Hellmuth | 60/456 |
| 3,451,381 A | * | 6/1969 | Armstrong | 123/243 |
| 3,560,118 A | * | 2/1971 | Palachick | 418/26 |

(Continued)

FOREIGN PATENT DOCUMENTS

FR        755096 A        11/1933  
(Continued)

*Primary Examiner* — Thai Ba Trieu  
(74) *Attorney, Agent, or Firm* — Laurence A. Greenberg; Werner H. Stemer; Ralph E. Locher

(57) ABSTRACT

The housing of a vane-type machine has a largely cylindrical space for accommodating the vane cells. A shaft is eccentrically arranged in the housing. First and second guide plates are provided on the shaft. Slides displaceable largely radially to the shaft in the direction of the inner housing wall are guided by the guide plates. A vane cell is formed with the participation of two adjacent slides of the adjacent region of the inner housing wall and the volume of the vane cells in the region of an inlet opening differs from the volume of the vane cells in the region of an outlet opening. To increase the speed of the shaft and the temperature of the medium, the slides are lubricated by pressure oil and radially and axially guided by a guideway, which is fixed with respect to the housing.

6 Claims, 3 Drawing Sheets

U.S. PATENT DOCUMENTS

| | | | | |
|---|---|---|---|---|
| 3,723,033 | A * | 3/1973 | Tauscher | 123/243 |
| 4,299,097 | A * | 11/1981 | Shank et al. | 418/159 |
| 4,354,462 | A * | 10/1982 | Kuechler et al. | 123/241 |
| 4,385,873 | A * | 5/1983 | Richter | 418/257 |
| 4,410,305 | A * | 10/1983 | Shank et al. | 418/264 |
| 4,754,606 | A * | 7/1988 | Nam | 60/616 |
| 4,917,584 | A * | 4/1990 | Sakamaki et al. | 418/256 |
| 5,027,602 | A * | 7/1991 | Glen et al. | 60/651 |
| 5,087,183 | A | 2/1992 | Edwards | |
| 5,540,199 | A * | 7/1996 | Penn | 123/243 |
| 5,839,270 | A | 11/1998 | Jirnov et al. | |
| 5,996,355 | A * | 12/1999 | Jirnov et al. | 62/87 |
| 6,684,847 | B1 * | 2/2004 | Al-Hawaj | 123/243 |
| 2009/0087334 | A1 * | 4/2009 | Whitesell | 418/136 |
| 2009/0223480 | A1 * | 9/2009 | Sleiman et al. | 123/243 |
| 2011/0271674 | A1 * | 11/2011 | Teng et al. | 60/597 |

FOREIGN PATENT DOCUMENTS

| | | |
|---|---|---|
| FR | 2602011 A1 | 1/1988 |
| GB | 107892 A | 7/1917 |
| GB | 235095 A | 6/1925 |
| GB | 2192939 A | 1/1988 |
| JP | 6501758 T | 2/1999 |
| KR | 920007283 B1 | 8/1992 |

* cited by examiner

VANE-CELL MACHINE AND METHOD FOR WASTE HEAT UTILIZATION, USING VANE-CELL MACHINES

BACKGROUND OF THE INVENTION

Field of the Invention

The invention relates to a vane-cell machine for the expansion or compression of gaseous media, such as air, exhaust gases from an internal combustion engine, vaporous media or a mixture thereof, and also to a method for waste-heat utilization, preferably using at least one vane-cell machine.

A vane-cell machine is known from DE 201 17 224 U1. So that the expansion profile can be better adapted to thermal requirements and so that a vane-cell machine can be produced at low production costs, a vane-cell machine with vane-cell units is proposed which has cell volumes increasing and decreasing in the direction of rotation.

BRIEF SUMMARY OF THE INVENTION

The object on which the invention is based is to specify a reliable and efficient vane-cell machine and just such a method for the utilization of waste heat.

The vane-cell machine according to the invention serves for the expansion or compression of gaseous media, such as, in particular, air, exhaust gases from an internal combustion engine with a temperature of up to 500° C., vaporous media or a mixture thereof. The vane-cell machine has a housing which has a largely cylindrical space or a space of non-constant radius for receiving the vane cells of the vane-cell machine and also an inlet port and an outlet port in the space. A shaft is arranged eccentrically in the housing. First and second guide plates arranged essentially parallel to one another are provided on the shaft. The guide plates guide slides displaceable essentially radially with respect to the shaft in the direction of the inner wall of the housing. A vane cell is formed in each case by two adjacent slides and the adjacent region of the inner wall of the housing. The volume of the vane cells in the region of the inlet port differs from the volume of the vane cells in the region of the outlet port. According to the invention, the slides displaceable radially in the direction of the inner wall of the housing are preferably lubricated with pressure oil and guided radially and axially by a guide track. The guide track is configured at a fixed location with respect to the housing and is likewise preferably lubricated with pressure oil.

In a preferred embodiment of the invention, a first and/or a second continuous guide track are/is provided. This guide track or these guide tracks limits or limit the movement of the slides displaceable radially in the direction of the inner wall of the housing, in each case in such a way that the slide or that side of the slide which faces the inner wall of the housing, that is to say the end face of the slide, moves, essentially free of contact, along its entire path of movement, past the inner wall of the housing.

The vane-cell machine according to the invention serves for the expansion or compression of gaseous media, such as, in particular, air, exhaust gases from an internal combustion engine with a temperature of up to 500° C., vaporous media or a mixture thereof. The vane-cell machine has a housing which has a largely cylindrical space or a space of non-constant radius for receiving the vane cells of the vane-cell machine and also an inlet port and an outlet port in the space. A shaft is arranged eccentrically in the housing. A first and a second guide plate arranged essentially parallel to one another are provided on the shaft. The guide plates guide slides displaceable essentially radially with respect to the shaft in the direction of the inner wall of the housing. A vane cell is formed in each case by two adjacent slides and the adjacent region of the inner wall of the housing. The volume of the vane cells in the region of the inlet port differs from the volume of the vane cells in the region of the outlet port. According to the invention, the slides displaceable radially in the direction of the inner wall of the housing are preferably lubricated with pressure oil and are guided radially and axially by a guide track. The guide track is configured at a fixed location with respect to the housing and is likewise preferably lubricated with pressure oil.

In a preferred embodiment of the invention, a first and/or a second continuous guide track are/is provided. This guide track or these guide tracks limits or limit the movement of the slides displaceable radially in the direction of the inner wall of the housing, in each case in such a way that the slide or that side of the slide which faces the inner wall of the housing, that is to say the end face of the slide, moves, essentially free of contact, along its entire path of movement, past the inner wall of the housing.

This contact-free movement is achieved, in a preferred embodiment of the invention, by a non-cylindrical housing and a circular guide track or by a cylindrical housing and a noncircular guide track or by a special form of the housing and of the guide track.

In the case of a noncylindrical housing and a circular guide track, the following equations are to be solved numerically according to R, in order to arrive at a preferred embodiment of the invention:

$$x^2 = \frac{t^2}{4} + \left[b - a\cos\left(\varphi + \arcsin\frac{t}{2x}\right) + \sqrt{r^2 - a^2\sin^2\left(\varphi + \arcsin\frac{t}{2x}\right)}\right]^2$$

$$x^2 = \frac{t^2}{4} + \left[b - a\cos\left(\varphi + \arcsin\frac{t}{2x}\right) + \sqrt{r^2 - a^2\sin^2\left(\varphi - \arcsin\frac{t}{2x}\right)}\right]^2$$

The higher value of the two equations is used for the preferred design.

In this case, the following abbreviations apply:
x: the distance from the axis of rotation of the shaft to the wall of the housing
t: the width of the slides on the end face
b: the distance from the center point of the guide pins of the slides (140-151) to the end face of the slides
a: the distance between the axis of rotation of the shaft and the center point of the circular guide track
φ: the angle between the line x and the straight line through the center point of the rotor and the point of minimum distance between the shaft and the housing
r: the radius of the guide track In the case of a cylindrical housing and a noncircular guide track, in a further preferred embodiment of the invention the following relations apply:

$$y = \sqrt{R^2 - \left(e\cdot\sin\varphi + \frac{t}{2}\right)^2} - e\cdot\cos\varphi - b$$

for $$0 \leq \varphi \leq \pi$$

-continued for $$y = \sqrt{R^2 - \left(e \cdot \sin\varphi - \frac{t}{2}\right)^2} - e \cdot \cos\varphi - b$$

$$\pi \leq \varphi \leq 2\pi$$

The explanation of the abbreviations is as follows:
y: the distance from the axis of rotation of the shaft to the center of the guide track
R: the radius of the cylindrical housing
e: the distance between the axis of rotation of the shaft and the center point of the cylindrical housing
t: the width of the slides on the end face
φ: the angle between the line y and the straight line through the center point of the rotor and the point of minimum distance between the shaft and the housing
b: the distance from the center point of the guide pins of the slides to the end face of the slides The embodiment according to the invention with a cylindrical housing and with a noncircular guide track is particularly preferred.

Owing to the lack of mechanical contact by virtue of the measures according to the invention, virtually no friction occurs between the end face of each slide and the inner wall of the housing. The useful life and the efficiency are thereby markedly increased, as compared with frictional vane-cell machines. Owing to the absence of mechanical contact, the vane wheel or the vane cells of the vane-cell machine according to the invention rotates or rotate even in the case of a markedly lower differential pressure between the inlet port and outlet port. As a result, the vane-cell machine according to the invention makes it possible to use energy resources having low pressure differences, as compared with ambient pressure, which it has not been possible previously to utilize with a conventional vane-cell machine. Pressure equalization between the cells of the vane-cell machine via the small gap between the end face of each slide and the inner wall of the housing is virtually irrelevant.

In a preferred embodiment of the invention, a first guide track plate which is provided with the first guide track is provided, which is largely parallel to the first guide plate rotating together with the shaft. The first guide track plate is arranged fixedly in terms of rotation with respect to the housing.

In a further preferred embodiment of the invention, a second guide track plate which is provided with the second guide track is provided, which is largely parallel to the second guide plate rotating together with the shaft. The second guide track plate is arranged fixedly in terms of rotation with respect to the housing.

By virtue of these measures according to the invention, a compact set-up of the vane-cell machine and yet an accurate guidance, contact-free with respect to the inner wall of the housing, of the slides of the vane-cell machine can be achieved. The two guide track plates can be adjusted accurately in relation to one another. The result is a tilt-free radial movement of the slides. The first and, if appropriate, also the second guide track are preferably provided in the respective guide track plate in such a way that the distance of the end faces of the radially movable slides from the inner wall of the housing remains largely constant during the operation of the vane-cell machine. The first and, if appropriate, the second guide track may likewise be adapted to the eccentric arrangement of the shaft in the housing in such a way that the distance of the end face of the slides from the inner wall of the housing decreases during the rotational movement of the vane cells and the accompanying increasing pressure, that is to say, with an increasing pressure, adjacent vane cells are separated or sealed off from one another more effectively. This has an advantageous effect on the efficiency of the vane-cell machine.

In an advantageous embodiment of the invention, there is provision for the first and/or the second guide track plate to be screwed to the housing. Furthermore, there may be provision for the first and/or the second guide track plate to form the first and/or the second end face of the housing.

In a preferred embodiment of the invention, there is provision for the slides to be provided in each case with a first and/or a second guide pin which is led in each case through a longitudinal groove which in each case runs radially with respect to the shaft and is provided in the first and/or the second guide plate. A largely tilt-free radial displacement of the slides can thereby be carried out.

In a preferred embodiment of the invention, there is provision for there to be provided on the guide pin a crescent-shaped guide track sickle which is movable in rotation about its longitudinal axis and which is guided by the guide track. The guide track is preferably lubricated with pressure oil and/or mounted with pressure oil. By means of the guide track sickle, the forces occurring on the guide track during the radial displacement of the slides can be distributed to a larger area of the guide track and/or, if appropriate, of an oil film, as a result of which, in particular, the frictional losses and therefore possible wear can be reduced. By means of pressure-oil lubrication and/or pressure-oil mounting preferred according to the invention, the rotational speed of the shaft of the vane-cell machine can be markedly increased, as compared with a rolling mounting, and even media with markedly higher temperatures can be used, free of faults. Owing to the pressure-oil mounting of the guide track sickle, axial forces which arise can also be absorbed, in contrast to a rolling mounting. This has a positive effect on the efficiency, overall size, useful life and reliability of the vane-cell machine according to the invention.

In a further embodiment of the invention, there is provision for the first and/or the second guide track to be formed by a continuous guide track groove which is preferably milled in the inner surface of the first and/or of the second guide track plate. A cost-effective, accurate and reliable guidance of the slides in the radial and the axial direction can thereby be achieved.

In one embodiment, the vane-cell machine according to the invention has ducts which carry lubricating oil and which supply lubricating oil to the guide pin and/or the guide track sickle and/or in each case to a radially extending running groove of the slide in the first and/or the second guide plate. The supply of lubricating oil preferably takes place via at least one duct carrying lubricating oil in the shaft and/or the discharge of lubricating oil preferably takes place via at least one duct, discharging lubricating oil, in the first and/or the second guide plate. As a result, the reliability and the efficiency can be markedly improved by virtue of a possible increase in the rotational speed and the temperature of the medium used in the vane-cell machine according to the invention.

The method according to the invention for waste-heat utilization is preferably implemented using at least one vane-cell machine according to the invention. The exhaust gas from a stationary or mobile combustion apparatus is supplied to a first heat transfer device and/or an exhaust gas turbocharger. A first vane-cell machine compresses the air which is under ambient pressure, and the compressed air is supplied to the heat transfer device. The heat energy contained in the exhaust gas is then supplied to the compressed air. A second vane-cell machine expands or decompresses the compressed and heated air to a pressure which is lower than the pressure of the exhaust gas from the combustion apparatus or, if appropriate, lower than the pressure of the exhaust gas at the outlet of the turbocharger. The decompressed air and the exhaust gas leaving the heat transfer device or, if appropriate, the exhaust gas turbocharger are supplied to a third vane-cell machine. The third vane-cell machine expands the mixture of exhaust gas and air to ambient pressure and at the same time performs useful work.

The method according to the invention is distinguished by high efficiency and, particularly when vane-cell machines according to the invention are used, allows the expedient utilization of energy resources which are otherwise simply discharged, unused, into the environment in an undesirable way.

According to one embodiment of the invention, there is provision for the first vane-cell machine according to the invention to compress the air under ambient pressure or atmospheric pressure to approximately double the pressure of the outlet pressure of the exhaust gas at the exhaust manifold of the combustion apparatus or, if appropriate, to approximately double the pressure of the outlet pressure of the exhaust gas downstream of the turbocharger. The efficiency of the invention can thereby be further improved.

In one embodiment of the method according to the invention, there is provision for the combustion apparatus to be supplied with compressed ambient air which has been compressed by the first vane-cell machine. As a result, in the case of a suitable combustion apparatus, its efficiency can likewise be increased.

In one embodiment of the invention, a second heat transfer device is provided, which is supplied with heat energy from a cooling circuit of the combustion apparatus and with the residual heat of the exhaust gas/air mixture of the third vane-cell machine. The gaseous medium discharged by the second heat transfer device is expanded by a fourth vane-cell machine and at the same time performs useful work. By virtue of this measure according to the invention, the waste heat of the cooling circuit of an internal combustion engine can also advantageously be utilized.

In one embodiment of the method according to the invention, there is provision for the second heat transfer device to be an evaporation device which is supplied with liquid extracted from a liquid reservoir and acted upon with pressure by a pump, in particular water, nitrogen dioxide or cyclosiloxanes. The efficiency, already achievable by means of the method according to the invention, in the utilization of waste heat can thereby be further improved.

In one embodiment of the invention, there is provision for a gaseous medium expanded by the fourth vane-cell machine to be supplied to a condensation device, in which the gaseous medium condenses and at the same time discharges heat, and the liquid is supplied to the liquid reservoir. By virtue of this measure, an advantageous closed circuit for utilizing the residual heat of the exhaust gas/air mixture and the waste heat from the cooling circuit of the combustion apparatus is achieved.

The vane-cell machine according to the invention and the method according to the invention for waste-heat utilization are described in more detail below by means of exemplary embodiments, using drawings which are not necessarily true to scale. The same reference symbols designate identical or identically acting elements. In the drawings:

DESCRIPTION OF THE INVENTION

Figure 1:
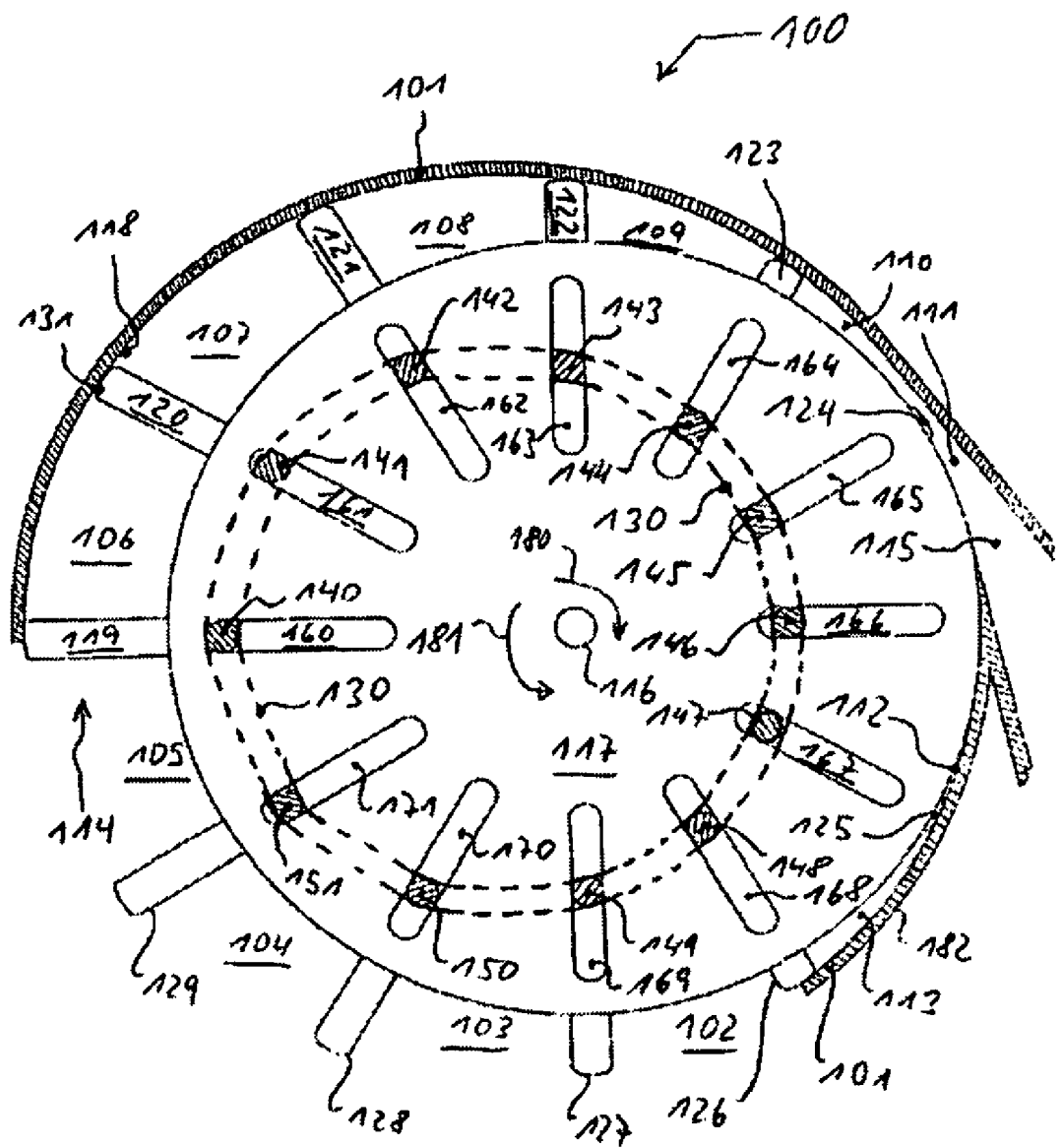
FIG. 1 shows a vane-cell machine according to the invention in a sectional drawing which illustrates the operating principle according to the invention.

FIG. 1 shows, by means of a diagrammatic cross-sectional drawing, the operating principle of a vane-cell machine 100 according to the invention for the expansion or compression of gaseous media, such as air, exhaust gases from an internal combustion engine, vaporous media or a mixture thereof. The housing 101 of the vane-cell machine 100 has a largely part-circular cross section and has vane cells 102 to 113 in its largely cylindrical inner space and outwardly an inlet port 114 and an outlet port 115. A drive or driven shaft 116 is arranged eccentrically in the housing 101. A first guide plate 117 and a second guide plate (not illustrated) are provided on the shaft 116. The guide plates guide slides 119 to 129 in such a way that the slides can move essentially radially with respect to the shaft 116 in the direction of the inner wall 118 of the housing 101.

When the shaft 116 is driven mechanically, it rotates, together with the guide plates, in the housing. By virtue of the centrifugal force, the slides 119 to 129 are moved radially outward during rotation. In this case, they are guided (not illustrated) in each case between two guide walls which are fastened to the guide plates and which close (not illustrated) the vane cells 102 to 113, together with the shaft 116, with respect to the latter. Each of the vane cells is therefore open outwardly only in the radial direction, insofar as the vane cell is not located in the region of the inner wall 118 of the housing 101. The end face 131 of each slide 119 to 126 moves, at a slight distance from the inner wall 118 of the housing 101, past the inner wall, that is to say the slides 119 to 126 and thereafter also the slides 127 to 129 move, preferably largely or completely free of contact, past the inner wall 118 of the housing 101. In this exemplary embodiment, air under atmospheric pressure is located in the region of the inlet port 114. When the shaft 116 is rotated clockwise 180 mechanically, for example by an electric motor or internal combustion engine, the air passes via the inlet port 114 into the subsequently largely closed vane cell 106. On its way from the inlet port 114 to the outlet port 115, the air is compressed on account of the decreasing volume of the vane cell. The compressed air leaves the vane-cell machine via the outlet port 115. Part of the compressed air remains in the vane cell, and, according to the invention, this air is expanded to atmospheric pressure on its way from the outlet port 115 to the inlet port 114.

By contrast, if an increased pressure prevails in the region of the outlet port 115, as compared with the inlet port 114, and the shaft 116 can rotate largely freely, the outlet port 115 becomes an inlet port and the inlet port 114 becomes an outlet port of the vane-cell machine 100. In this case, the reverse process takes place, and the vane-cell machine decompresses the gaseous medium entering. In this case, the shaft 116 is rotated counterclockwise 181 and, for example, drives an electric motor, not illustrated, that is to say the vane-cell machine or its shaft 116 performs work.

According to the invention, there is provision for the housing 101 with a largely circular cross section per se to have in a part region 182 a radius increasing from the outlet port 115 to the inlet port 114. As a result, the air which enters the vane cell 113 (in the event of a movement of the shaft 116 counterclockwise 181) and is under atmospheric pressure is expanded to a lower pressure, for example 0.95 bar. This pressure difference assists the rotation of the shaft and consequently increases the efficiency of the vane-cell machine 100.

In order to achieve a largely contact-free sliding of the end face 131 of each slide past the inner wall 118 of the housing 101, according to the invention at least one guide track 130 is provided. The guide track 130, illustrated diagrammatically, determines the radial position of each slide 119 to 129. The continuous guide track is preferably a guide groove or guide duct (not illustrated) which is located in the rear side of a guide track plate (not illustrated) and which is largely parallel to the guide plate 117 rotating together with the shaft 116. In contrast to the guide plate 117, the guide track plate (not illustrated) is arranged fixedly in terms of rotation with respect to the housing 101. Preferably, the guide track plate is screwed to the housing and closes the housing upwardly. A guide pin 140 to 151 of each slide 119 to 129 runs preferably with a form fit in the guide track 130. During the rotation of the shaft, each slide provided with a guide pin is guided into a predetermined position via the form fit of the guide track and pin, with the result that the respective vane cell is largely sealed off with respect to the inner wall of the housing and yet a contact of the end face of each slide with the housing or with the housing wall is largely avoided. An essentially friction-free rotation of the vane cells is thereby achieved, without this leading to any appreciable pressure loss via the gap remaining between adjacent vane cells. Overall, the efficiency of the vane-cell machine 100 according to the invention is markedly higher than in known frictional vane-cell machines.

This applies particularly in the case of low differential pressures between the inlet port and outlet port, because, even in this case, the vane cells can rotate and perform work on account of their essential freedom from friction, in contrast to known highly frictional vane-cell machines. So that low differential pressures can also be utilized, the vane-cell machine according to the invention or its vane cells may be designed with larger dimensions. By contrast, an increase in the dimensions of known frictional vane-cell machines also increases their frictional forces to be overcome, and therefore, in known vane-cell machines, this measure does not lead to any improvement.

In a preferred embodiment of the invention (not illustrated), the underside of the housing also has provided on it a guide track plate screwed to the housing and having a guide track for guiding lower pins (not illustrated) which are likewise attached to the slides.

Owing to the double guidance, the slides can be guided radially, largely tilt-free. Furthermore, according to the invention, the pins may be provided in each case with a guide track sickle which can be rotated about the pins and which is guided by the guide track. As compared with a pin, the guide track sickle has a larger contact surface with the guide track, which is preferably lubricated with pressure oil, with the result that the surface pressure falls, friction is further reduced and reliability or useful life increases.

Preferably, the slides and the guide pins or the guide track sickles are lubricated and/or mounted in their guides via suitable ducts (not illustrated) carrying lubricating oil. What is preferred is pressure-oil lubrication or pressure-oil mounting, since higher rotational speeds and higher temperatures of the medium used than, for example, in rolling mountings, can be implemented, with the result that the efficiency rises and the structural dimensions and consequently the costs can be reduced.

Figure 2:
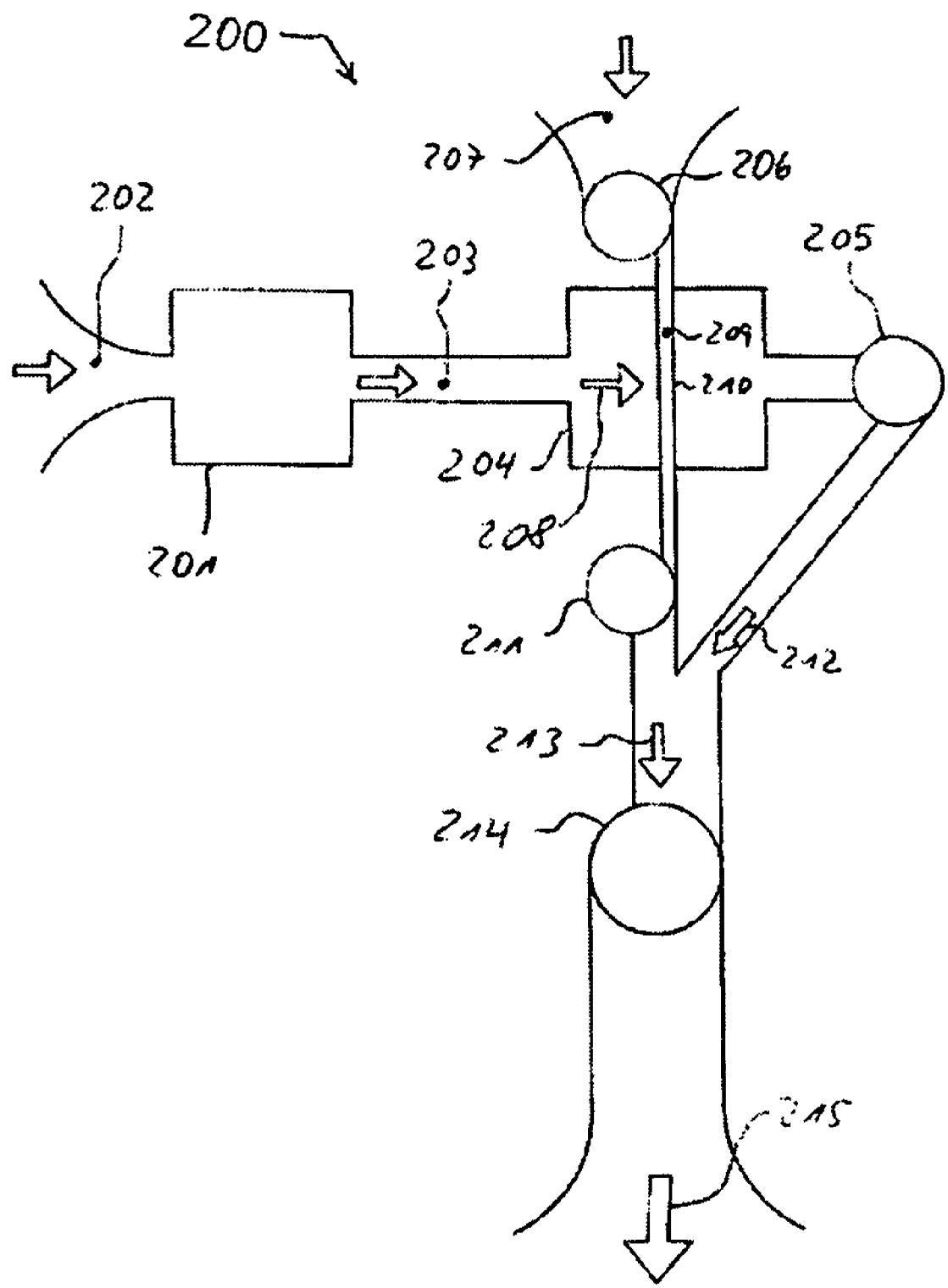
FIG. 2 shows a first system according to the invention for waste-heat utilization, with reference to which the method according to the invention is described.

FIG. 2 shows a first system according to the invention for waste-heat utilization, with reference to which the method according to the invention is described. The system according to the invention has a combustion apparatus 201, a first heat transfer device 204 with an inlet and with an outlet, an exhaust gas turbocharger 205, a first vane-cell machine 206, a connecting line 210, a second vane-cell machine 211 and a third vane-cell machine 214.

The combustion apparatus 201 sucks in air 202 under ambient pressure or atmospheric pressure and expels hot exhaust gas 203. The hot exhaust gas is supplied to the first heat transfer device 204 via its inlet. Air under atmospheric pressure 207 is sucked in by the first vane-cell machine 206 and compressed to approximately double the outlet pressure of the exhaust gas at the exhaust manifold of the combustion apparatus. If, by contrast, the combustion apparatus has an exhaust gas turbocharger, as illustrated, the air is compressed by the first vane-cell machine to approximately double the outlet pressure of the exhaust gas downstream of the exhaust gas turbocharger. During compression, tap air for the combustion apparatus may be extracted (not illustrated) from the first vane-cell machine. The compressed air 209 is led into the connecting line 210 which connects the outlet of the first vane-cell machine 206 to the inlet of the second vane-cell machine 211. The connecting line 210 is arranged (not illustrated) in the form of heat coils in the heat transfer device 204, in order to transfer a large part of the heat energy 208 contained in the exhaust gas to the compressed air led through the connecting line 210. In the heat transfer device, the compressed air is heated on the countercurrent principle approximately to the temperature of the exhaust gas, and the exhaust gas is cooled approximately to the temperature of the compressed air. The heated compressed air enters the second vane-cell machine 211 and decompressed air leaves the second vane-cell machine. The air emerging from the second vane-cell machine 211 has a pressure which lies below the pressure of the exhaust gas emerging from the combustion apparatus or, if an exhaust gas turbocharger is present, as illustrated, below the pressure of the exhaust gas emerging from the exhaust gas turbocharger.

A further connecting line connects the outlet of the heat transfer device 204 to the inlet of the exhaust gas turbocharger 205 and supplies this with the cooled exhaust gas from the combustion apparatus. The exhaust gas compressed by the exhaust gas turbocharger 205 and leaving the turbocharger at the outlet 212 is combined with the compressed air discharged from the second vane-cell machine 211. The mixture 213 of compressed air and of compressed exhaust gas is supplied to the inlet of the third vane-cell machine 214 which expands the compressed mixture to a mixture 215 having atmospheric pressure. During decompression in the third vane-cell machine 214, the latter performs work, for example via an electric generator flanged to the shaft of the third vane-cell machine.

Figure 3:
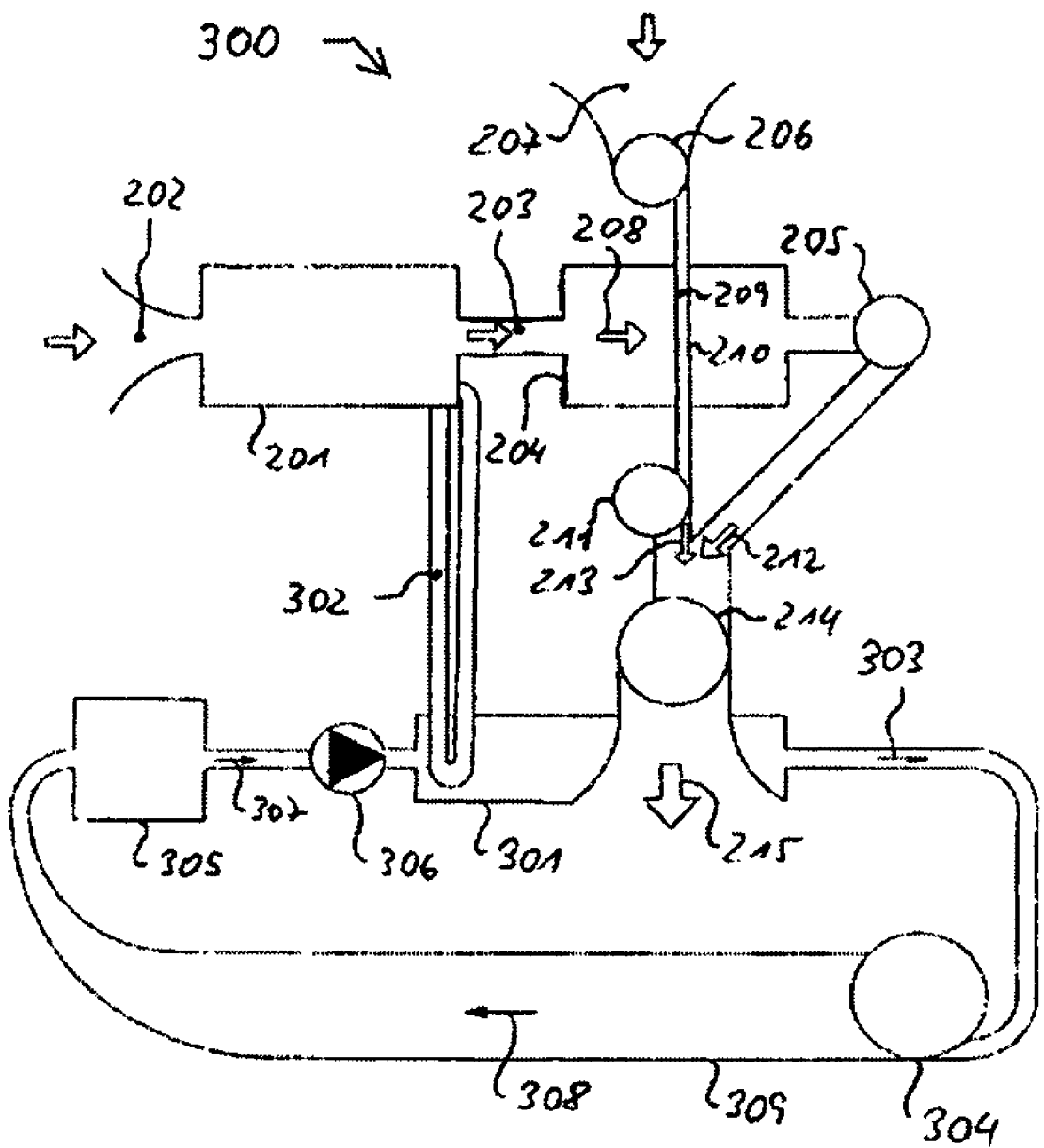
FIG. 3 shows a second system according to the invention for waste-heat utilization which has been further improved, as compared with the first system.

FIG. 3 shows a second system according to the invention for waste-heat utilization which has been further improved in relation to the first system 200 illustrated in FIG. 2. In addition to the first system, the second system 300 has a second heat transfer device 301, a cooling circuit 302 of the combustion apparatus 201, a fourth vane-cell machine 304, a liquid reservoir 305, a pump 306 and a condensation device 309.

The expanded mixture of air and exhaust gas 215 emerging from the third vane-cell machine and the cooling circuit 302 heating the second heat transfer device 301 supply heat energy to the second heat transfer device. An evaporable liquid 307 present in the liquid reservoir 305 is pumped into the second heat transfer device by the pump 306. In the second heat transfer device 301, the liquid supplied is evaporated on account of the heat energy supplied via the cooling circuit 302 and the mixture 215 of expanded air and of expanded exhaust gas. The vapor has a pressure which is higher than the pressure of the liquid in the liquid reservoir 305. The vapor is supplied to the inlet of the fourth vane-cell machine 304 and via the outlet of the latter is supplied, after the expansion or decompression of the vapor, to the condensation device 309. The liquid 308 occurring in the condensation device is recirculated into the liquid reservoir 305.

During the expansion of the vapor, the fourth vane-cell machine 304 performs useful work, for example via an electric generator flanged to the shaft of the vane-cell machine 304.

If the systems illustrated in FIGS. 2 and 3 are provided with vane-cell machines according to the invention, as is preferred according to the invention, then the systems are distinguished, in particular, by particularly high efficiencies. Moreover, even low differential pressures can be utilized for performing work or for generating electrical current.

LIST OF REFERENCE SYMBOLS

100 Vane-cell machine
101 Housing
102 to 113 Vane cell
114 Inlet port
115 Outlet port
116 Shaft
117 Guide plate
118 Inner wall
119 to 129 slide
130 Guide track
131 End face
140 to 151 Guide pin
160 to 171 Longitudinal groove
180 Clockwise rotation
181 Counterclockwise rotation
182 Part region of the housing
200 First system according to the invention for waste-heat utilization
201 Combustion apparatus
202 Air under atmospheric pressure
203 Exhaust gas
204 Heat transfer device
205 Exhaust gas turbocharger
206 First vane-cell machine
207 Air under atmospheric pressure
208 Heat energy contained in the exhaust gas
209 Compressed air
210 Connecting line
211 Second vane-cell machine
212 Outlet of the exhaust gas turbocharger
213 Mixture of air and exhaust gas
214 Third vane-cell machine
215 Expanded mixture of air and exhaust gas
300 Second system according to the invention for waste-heat utilization
301 Second heat transfer device
302 Cooling circuit
303 Gaseous medium
304 Fourth vane-cell machine
305 Liquid reservoir
306 Pump
307 Liquid
308 Liquid
309 Condensation device

The invention claimed is:
1. A method of utilizing waste-heat of a system, the system comprising:
a stationary or mobile combustion apparatus;
vane-cell machines, each of the vane-cell machines comprising:
a housing;
wherein the housing has a largely cylindrical space for receiving the vane cells of the vane-cell machine and also an inlet port and an outlet port in the cylindrical space,
a shaft arranged eccentrically in the housing, with a first and a second guide plate arranged essentially parallel to one another on the shaft,
slides guided by the first and the second guide plates and displaceable essentially radially with respect to the shaft in the direction of an inner wall of the housing,
a plurality of vane cells, each of the plurality of the vane cells being formed in each case by two adjacent slides and an adjacent region of the inner wall of the housing,
a volume of said each of the plurality of the vane cells in a region of the inlet port differing from a volume of said each of the plurality of the vane cells in a region of the outlet port,
wherein the slides are displaceable radially in the direction of the inner wall of the housing are guided by at least one of a first continuous guide track and a second continuous guide track,
wherein each of the first continuous guide track and the second continuous guide track is at a fixed location with respect to the housing;
wherein said at least one of a first continuous guide track and a second continuous guide track limits the movement of the slides displaceable radially in the direction of the inner wall of the housing; and
wherein each of the slides faces the inner wall of the housing, and wherein at an end face of the slide, said each of the slides moves, free of contact, along an entire path of movement, and past the inner wall of the housing;
the method comprising the steps of:
supplying exhaust gas from the stationary or mobile combustion apparatus to a first heat transfer device and to an exhaust gas turbocharger,
compressing air at ambient pressure with a first one of the vane-cell machines and supplying the compressed air to the first heat transfer device wherein heat energy contained in the exhaust gas is transferred to the compressed air,
expanding the compressed and heated air with a second one of the vane-cell machines to a pressure being lower than the pressure of at least one of the exhaust gas from the combustion apparatus and the pressure of the exhaust gas at the outlet of the exhaust gas turbocharger, directing the expanded air and the exhaust gas leaving at least one of the heat transfer device and the exhaust gas turbocharger to a third one of vane-cell machines, and simultaneously expanding the mixture of exhaust gas and air to ambient pressure with third one of the vane-cell machines.

2. The method of utilizing waste-heat as claimed in claim 1, wherein the step of compressing the air under ambient pressure or atmospheric pressure with the first one of the van-cell machines to at least one of approximately double the pressure of the outlet pressure of the exhaust gas at the exhaust manifold of the combustion apparatus and approximately double the pressure of the outlet pressure of the exhaust gas downstream of the turbocharger.

3. The method of utilizing waste-heat as claimed in claim 1, supplying compressed ambient air which has been compressed by the first one of the vane-cell machines to the stationary or mobile combustion apparatus.

4. The method of utilizing waste-heat as claimed in claim 1, further comprising: transferring heat energy with a second heat transfer device from a cooling circuit of the combustion apparatus and with the residual heat of the exhaust gas/air mixture of the third one of the vane-cell machines, and discharging the gaseous medium from the second heat transfer device; and simultaneously expanding the gaseous medium with a fourth vane-cell machines.

5. The method of utilizing waste-heat as claimed in claim 1, wherein the second heat transfer device is an evaporation device which is supplied with liquid extracted from a liquid reservoir and acted upon with pressure by a pump, and wherein the liquid is one of water, nitrogen dioxide and cyclosiloxanes.

6. The method of utilizing waste-heat as claimed in claim 1, wherein: supplying the gaseous medium expanded by the fourth one of the vane-cell machines to a condensation device, condensing the gaseous medium in the condensation device and simultaneously discharging heat from the liquid to the atmosphere, and supplying the liquid to the liquid reservoir.

* * * * *